(12) United States Patent
Kos et al.

(10) Patent No.: US 11,614,348 B1
(45) Date of Patent: Mar. 28, 2023

(54) HEAT RESISTANT DATA ACQUISITION DEVICE BASE

(71) Applicant: Windrock, Inc., Knoxville, TN (US)

(72) Inventors: Marek Kos, Knoxville, TN (US); Zachary Thompson, Knoxville, TN (US)

( * ) Notice: Subject to any disclaimer, the term of this patent is extended or adjusted under 35 U.S.C. 154(b) by 0 days.

(21) Appl. No.: 17/648,924

(22) Filed: Jan. 25, 2022

Related U.S. Application Data

(60) Provisional application No. 63/140,984, filed on Jan. 25, 2021.

(51) Int. Cl.
*G01D 11/24* (2006.01)

(52) U.S. Cl.
CPC .................. *G01D 11/245* (2013.01)

(58) Field of Classification Search
CPC .................................................. G01D 11/245
See application file for complete search history.

(56) References Cited

U.S. PATENT DOCUMENTS

| | | |
|---|---|---|
| 6,292,757 B1 | 9/2001 | Flanagan et al. |
| 6,485,265 B2 | 11/2002 | Schroeder et al. |
| 6,845,664 B1 * | 1/2005 | Okojie ................ B81C 1/00301 |
| | | 73/431 |
| 7,328,130 B2 | 2/2008 | Wiles et al. |
| 7,403,850 B1 | 7/2008 | Boutin et al. |
| 8,522,750 B2 | 9/2013 | Flanagan et al. |
| 10,732,150 B2 | 8/2020 | Flanagan |
| 11,215,529 B1 | 1/2022 | Howard et al. |
| 2018/0163711 A1 | 6/2018 | Follmar et al. |
| 2018/0363641 A1 | 12/2018 | Follmar et al. |

* cited by examiner

*Primary Examiner* — Jamel E Williams
(74) *Attorney, Agent, or Firm* — Robinson IP Law, PLLC

(57) ABSTRACT

A base for supporting an electronic device on a surface. The base includes a body shaped to receive at least a portion of the electronic device thereon; a cavity formed in the body on a bottom portion of the body such that the cavity is between the electronic device and the surface when the electronic device is mounted on the base; a channel formed on the bottom portion of the body such that the channel is located between a portion of the electronic device and the surface, the channel shaped to allow air to flow therethrough; one or more apertures formed through the body, the one or more apertures in fluid communication with the channel to allow air through the channel; and a plurality of feet arranged around the body, the feet having a lower surface that is shaped to contact the surface.

20 Claims, 4 Drawing Sheets

HEAT RESISTANT DATA ACQUISITION DEVICE BASE

CROSS-REFERENCE TO RELATED APPLICATION

This application is a non-provisional of and claims priority to U.S. Provisional Patent Application Ser. No. 63/140,984 for a Heat Resistant Data Acquisition Device Base filed on Jan. 25, 2021, the contents of which are incorporated by reference herein in its entirety.

BACKGROUND AND FIELD

Various monitoring systems exist for monitoring machinery and other equipment. For example, reciprocating machinery may be monitored using various sensors capturing vibration and ultrasonic data from the reciprocating machinery. Data may be captured using a variety of sensors and acquisition devices that are mounted to the reciprocating machinery, such as on a surface of the reciprocating machinery or nearby equipment.

An environment where the sensors and data acquisition devices are located may be hostile to electronic devices. For example, sensors and data acquisition devices may be required to be mounted on the machinery itself to capture vibration and other data from the machinery, such as using one or more sensors on or in communication with the data acquisition device. The machinery may generate significant heat and mounting sensors and data acquisition devices in proximity to the machinery may cause damage to the sensors and data acquisition devices or otherwise impact the ability of those devices to collect data. Other factors may contribute to a hostile environment for electronic devices, such as when the electronic devices are located outdoors or in areas that are not protected from external environmental elements. High heat surfaces may further degrade components of the data acquisition devices and reduce a life and reliability of the data acquisition devices.

Although data acquisition devices may be located within housings that provide some protection from external elements, those devices are not typically mounted in a way that reduces any outside interference that results from environmental factors. As such, issues related to the mounting of data acquisition devices may cause issues with respect to the operation of the devices.

What is needed, therefore, is a heat resistant base for a data acquisition device or sensor that allows the device or sensor to be mounted on or in proximity to the machinery while reducing heat from being transferred to the device or sensor.

SUMMARY

The above and other needs are met by a heat resistant base for a data acquisition device or sensor. In one aspect, a base for supporting an electronic device on a surface includes: a body shaped to receive at least a portion of the electronic device thereon; a cavity formed in the body on a bottom portion of the body such that the cavity is between the electronic device and the surface when the electronic device is mounted on the base; a channel formed on the bottom portion of the body such that the channel is located between a portion of the electronic device and the surface, the channel shaped to allow air to flow therethrough; one or more apertures formed through the body, the one or more apertures in fluid communication with the channel to allow air through the channel; and a plurality of feet arranged around the body, the feet having a lower surface that is shaped to contact the surface.

In one embodiment, the feet further include a bore formed through the foot for receiving a fastener through the feet to secure the base on the surface. In another embodiment, the feet include a plurality of slots formed across a width of the lower surface.

In yet another embodiment, the base further includes a potting material located within the cavity of the body. In one embodiment, the body is formed of a low heat conductive polymer.

In another embodiment, the body further includes a threaded portion located on an upper side of the body for receiving a corresponding threaded portion of the electronic device to threadably secure the electronic device thereon. In yet another embodiment, the base further includes a cup-shaped portion to receive a portion of the electronic device thereon.

In one embodiment, the base further includes a magnet located on the base for securing the base to the surface. In another embodiment, the base includes an inverted cup located at a bottom of the body, the inverted cup shaped to receive the magnet therein. In yet another embodiment, the channel formed on the bottom portion of the channel circumscribes the magnet and inverted cup.

In one embodiment, the inverted cup includes a lip formed around an edge thereof, wherein the lip of the inverted cup is shaped to contact a lip formed on the body to secure the inverted cup to the body.

In another embodiment, the cup-shaped portion is circular for receiving an electronic device having a circular housing on the body of the base. In yet another embodiment, the feet are located outward of an outer edge of the electronic device when the electronic device is located on the base.

In one embodiment, the channel is defined between an inner portion of the feet and the body of the base. In another embodiment, the body further includes a ledge located on an inner portion of the body for supporting the electronic device above the cavity.

In another aspect, a base for supporting a data acquisition device on a surface includes: a body shaped to receive at least a portion of the acquisition device thereon; a cavity formed in the body on a bottom portion of the body such that the cavity is between the electronic device and the surface when the electronic device is mounted on the base; an insulating material located in the body, the insulating material located between a bottom side of the data acquisition device and a bottom of the body when the data acquisition device is located on the base; a channel formed on the bottom portion of the body such that the channel is located between a portion of the electronic device and the surface, the channel shaped to allow air to flow therethrough; one or more apertures formed through the body, the one or more apertures in fluid communication with the channel to allow air through the channel; and a plurality of feet arranged around the body, the feet having a lower surface that is shaped to contact the surface.

In one embodiment, the feet further include a plurality of slots formed across a width of the lower surface. In another embodiment, the base further includes a magnet located on the base for securing the base to the surface. In yet another embodiment, the base further includes an inverted cup located at a bottom of the body, the inverted cup shaped to receive the magnet therein.

In yet another aspect, a base for supporting a data acquisition device on a surface includes: a body shaped to receive at least a portion of the acquisition device thereon; a cavity formed in the body on a bottom portion of the body such that the cavity is between the electronic device and the surface when the electronic device is mounted on the base; an insulating material located in the body, the insulating material located between a bottom side of the data acquisition device and a bottom of the body when the data acquisition device is located on the base; a channel formed on the bottom portion of the body such that the channel is located between a portion of the electronic device and the surface, the channel shaped to allow air to flow therethrough; one or more apertures formed through the body, the one or more apertures in fluid communication with the channel to allow air through the channel; and a plurality of feet arranged around the body, the feet having a lower surface that is shaped to contact the surface, the feet further including a plurality of slots formed across a width of the lower surface.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
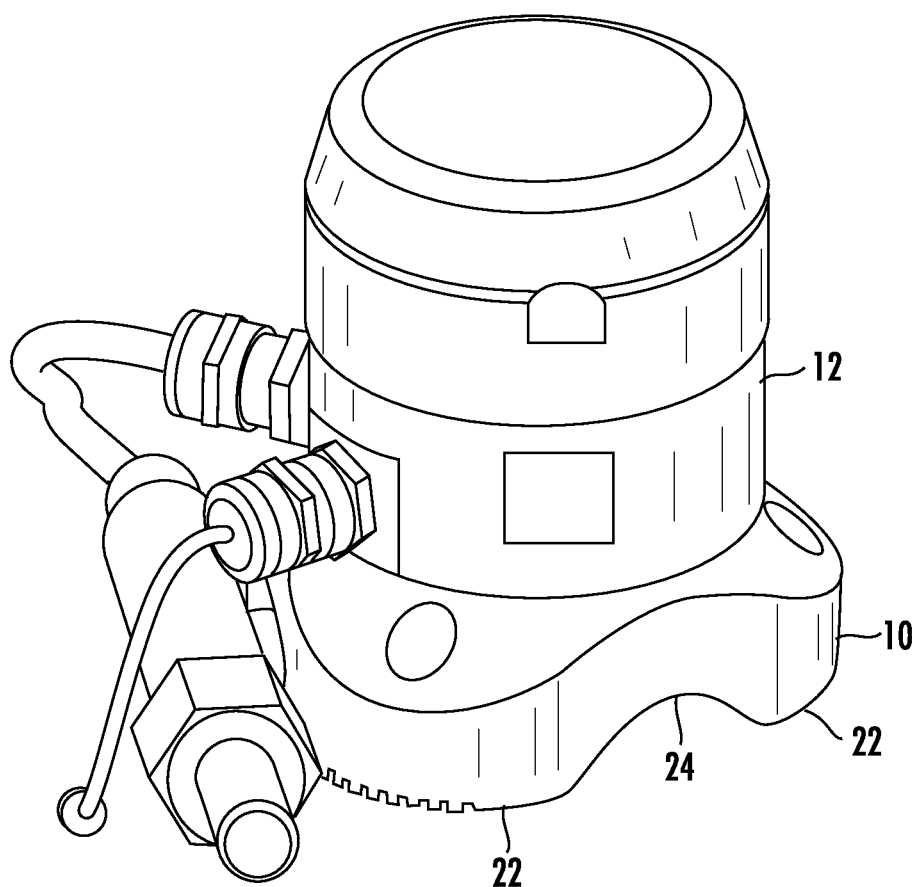
FIG. 1 shows a perspective side view of a data acquisition device mounted on a base according to one embodiment of the present disclosure.

FIG. 1 shows an embodiment of a base 10 for a data acquisition device 12. The base 10 is configured to support the data acquisition device 12 on a surface 11 (FIG. 3), such as a surface on or proximate to a piece of machinery (such as a high-speed engine) while reducing transfer of heat from a surface of the machinery to the data acquisition device 12 mounted on the base 10. The base 10 reduces transfer of heat from a surface to the data acquisition device 12 by reducing a surface area of the base 10 that is in contact with the surface and providing space for insulating materials and air flow between the data acquisition device 12 and the surface on which the base 10 is mounted. The base 10 is further preferably formed of a low heat conductive material, such as a low heat conductive polymer, to further reduce heat transfer from the surface to the data acquisition device 12 and components thereof.

Figure 2:
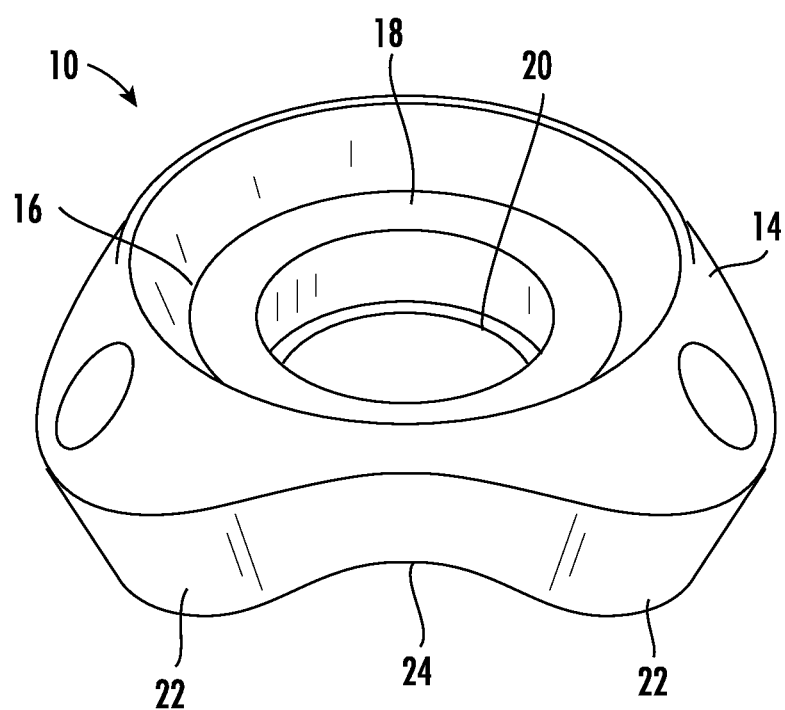
FIG. 2 shows a perspective top view of a base according to one embodiment of the present disclosure.

Referring to FIG. 2, the base 10 includes a body 14. The body 14 is shaped to receive at least a portion of the data acquisition device 12 on the base 10. For example, the body 14 may include a cup 16 located in an upper portion of the body 14 such that the data acquisition device 12 rests at least partially within the cup 16. The cup 16 may be circular in shape to conform to a shape of the data acquisition device 12, however it is also understood that a shape of the cup 16 may vary such that the cup 16 conforms to a shape of the data acquisition device 12 or otherwise receives the data acquisition device 12 on the base 10. The data acquisition device 12 may snugly fit within the cup 16 to secure the data acquisition device 12 within the cup 16, such that the data acquisition device 12 is maintained on the base 10 in a press fit arrangement with the cup 16. The data acquisition device 12 may be secured to the base 10, such as with one or more fasteners. In one embodiment, an outer surface of the data acquisition device 12 may be threaded and the cup 16 may include a corresponding threaded portion such that the data acquisition device 12 is threadably secured to the base 10.

The cup 16 is shaped to support the data acquisition device 12 above a surface on which the base 10 is mounted. For example, the cup 16 may include a ledge 18 formed around a bottom of the cup 16 for supporting the data acquisition device 12 above a bottom of the base 10 and a surface on which the base 10 is located. A cavity 20 may be formed in the base 10, such as below the cup 16. The cavity 20 is located such that the cavity 20 is below a bottom portion of the data acquisition device 12 such that the cavity 20 defines a space below the data acquisition device 12. The cavity 20 may be shaped to receive, for example, a magnet for securing the base 10 to a magnetic surface. Further, the cavity 20 may be shaped to receive various insulating materials to further insulate the data acquisition device 12 from heat. For example, a potting material may be located within the cavity 20. A foam material or insert may further be located between a bottom of the data acquisition device 10 and a bottom of the cavity 20 or between a bottom of the data acquisition device 10 and a magnet located within the cavity 20. In one embodiment, a high insulation material, such as silicone or neoprene foam or low heat conduction PTFE is located on the base 10 between the data acquisition device 12 and the surface on which the base 10 is mounted.

Referring again to FIG. 1, the base 10 includes a plurality of feet 22 for contacting the surface on which the base 10 is mounted. The plurality of feet 22 are preferably located towards outer sides of the base 10 and are shaped to mount against a surface on which the base 10 is installed. The base 10 further may include arches 24 located between the plurality of feet 22. The arches 24 are formed to create a passage such that air may flow through the arches 24 between a portion of an underside of the base 10 and the surface on which the base 10 is installed.

Figure 3:
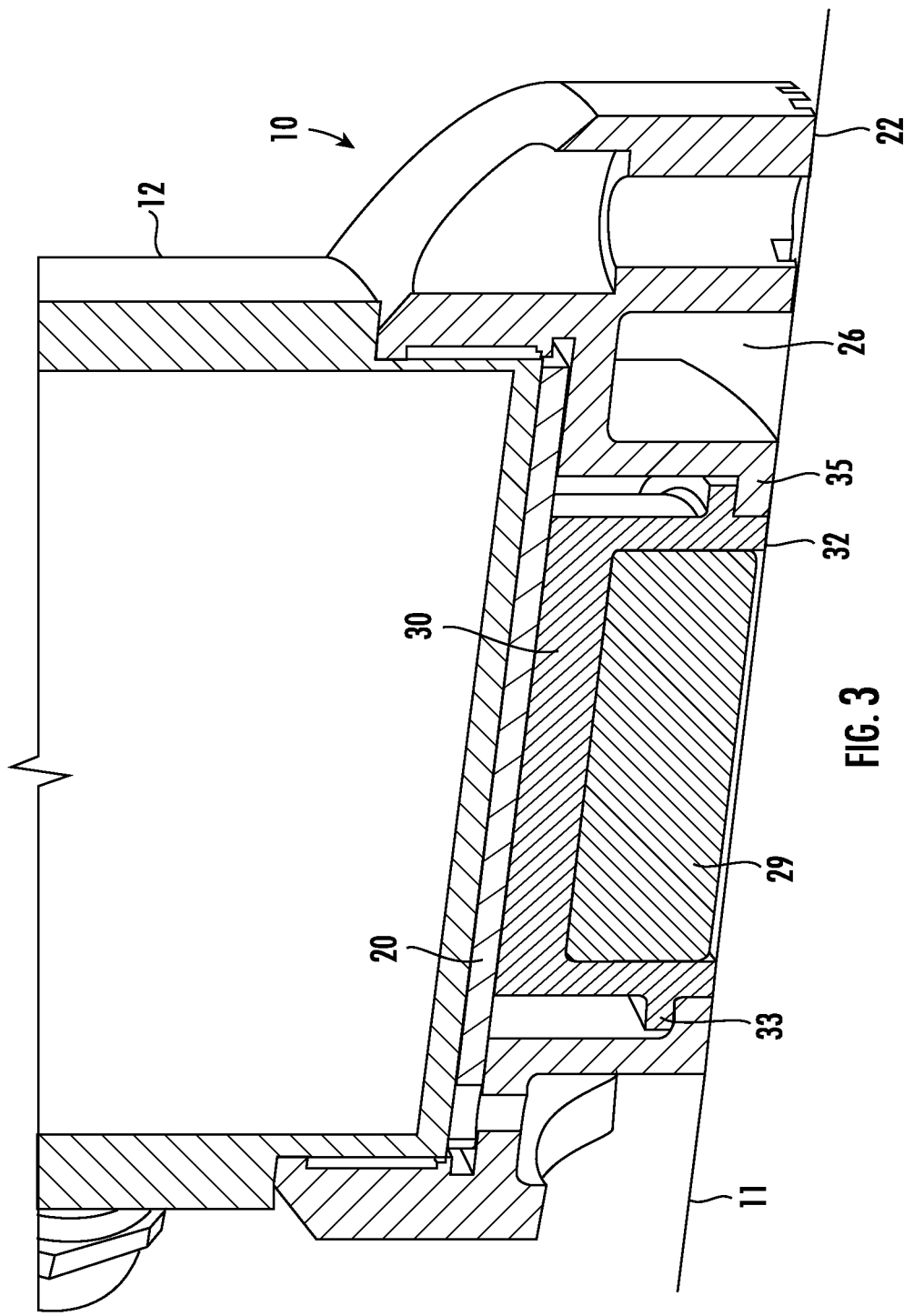
FIG. 3 shows a cross-sectional side view of a data acquisition device mounted on a base according to one embodiment of the present disclosure.
Figure 4:
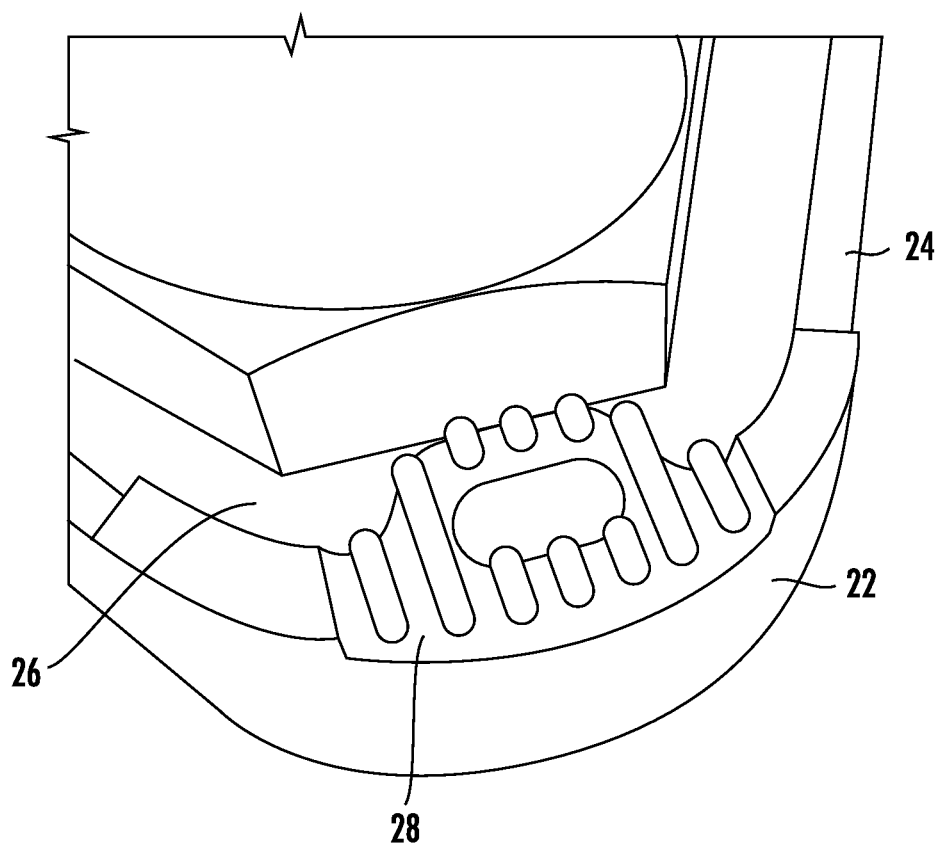
FIG. 4 shows a bottom view of a portion of a base having a channel according to one embodiment of the present disclosure.

Referring to FIGS. 3 and 4, the base 10 further includes a channel 26 located around an underside of the base 10. The channel 26 is in fluid communication with the passage formed by arches 24 such that air may flow through the arches 24 from an area around the base 10 and into or out of the channel 26. The channel 26 may be located at least partially underneath the data acquisition device 12 within the base 10. The channel 26 may circumscribe at least a portion of the base 10 in contact with the surface on which the base 10 is mounted, such as a portion that retains a magnet or other fastener securing the base 10 to the surface as described in greater detail below.

The plurality of feed 22 are preferably arranged around the base 10 such that the feet 22 are located outwardly around the channel 26 formed on the base 10. As shown in FIG. 3, the feet 22 may be located substantially outward from an outer edge of the data acquisition device 12 such that the feet 22 provide stable mounting of the base 10 to an underlying surface. The plurality of feet 22 may be shaped to receive a fastener located therethrough to secure the base 10 to an underlying surface. For example, the feet 22 may include a bore 25 formed through the feet 22 for receiving a fastener through the feet 22. The bore 25 is located on the foot 22 such that a fastener may be installed or removed without requiring removal of the data acquisition device 12 from the base 10. The bore 25 may include a reduced diameter portion, as shown in FIG. 3, such that a head of a fastener inserted therein abuts a lip 27 within the bore 25 to retain the base 10 on an underlying surface when the fastener is inserted through the bore 25 and into the underlying surface.

The base 10 may further include one or more slots 28 formed through the plurality of feet 22. The slots 28 may be in fluid communication with the channel 26 and an environment around the base 10 such that any water collected in the base, such as around the plurality of feet 22, may flow out of the base to prevent freezing of the water and any subsequent damage to the base 10.

Referring to FIG. 3, the base 10 may include a magnet 29 located within an inverted cup 30. The inverted cup 30 may be formed, for example, of a high permeability iron material to further increase magnetic field contact between the base 10 and a surface on which the base 10 is mounted. The cup 30 may further include an inwardly extending lip 32 for at least partially separating the magnet 29 from a surface on which the base 10 is mounted and to further retain the magnet 29 within the cup 30.

The inverted cup 30 may be secured on a bottom portion of the base 10. The inverted cup 30 may be removably secured on a bottom portion of the base 10. The inverted cup 30 may include an outwardly projecting cup lip 33 extending outwardly from sides of the inverted cup 30. The projecting cup lip 33 is shaped to engage a corresponding lip 35 located around an inner portion of a bottom of the base 10. The inverted cup 30 may be removably inserted into the base 10, such as through an upper portion of the base 10 when the data acquisition device is not mounted on the base 10. The corresponding lip 35 of the body contacts the projecting cup lip 33 to secure the base 10 to the inverted cup 30 and magnet mounted on the inverted cup 30.

The base 10 may be formed of a high-temperature polymer. The base 10 or portions of the base 10 in contact with a surface on which the base 10 is installed may be formed of a low heat conductive polymer to minimize heat transfer between a surface on which the base 10 is installed and the data acquisition device 12 located on the base 10.

The base 10 allows passive cooling of the data acquisition device 12 by encouraging air flow through portions of the base 10. Further, the base 10 insulates the data acquisition device 12 from heat radiating from a surface on which the base 10 is mounted, further reducing transfer of any heat from the surface to the data acquisition device.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A base for supporting an electronic device on a surface, the base comprising:
    a body shaped to receive at least a portion of the electronic device thereon;
    a cavity formed in the body on a bottom portion of the body such that the cavity is between the electronic device and the surface when the electronic device is mounted on the base;
    a channel formed on the bottom portion of the body such that the channel is located between a portion of the electronic device and the surface, the channel shaped to allow air to flow therethrough;
    one or more apertures formed through the body, the one or more apertures in fluid communication with the channel to allow air through the channel; and
    a plurality of feet arranged around the body, the feet having a lower surface that is shaped to contact the surface.

2. The base of claim 1, the feet further comprising a bore formed through the foot for receiving a fastener through the feet to secure the base on the surface.

3. The base of claim 1, the feet further comprising a plurality of slots formed across a width of the lower surface.

4. The base of claim 1, further comprising a potting material located within the cavity.

5. The base of claim 1, wherein the body is formed of a low heat conductive polymer.

6. The base of claim 1, further comprising a threaded portion located on an upper side of the body for receiving a corresponding threaded portion of the electronic device to threadably secure the electronic device thereon.

7. The base of claim 1, the base further including a cup-shaped portion to receive a portion of the electronic device thereon.

8. The base of claim 1, further comprising a magnet located on the base for securing the base to the surface.

9. The base of claim 8, further comprising an inverted cup located at a bottom of the body, the inverted cup shaped to receive the magnet therein.

10. The base of claim 9, wherein the channel formed on the bottom portion of the channel circumscribes the magnet and inverted cup.

11. The base of claim 9, the inverted cup including a lip formed around an edge thereof, wherein the lip of the inverted cup is shaped to contact a lip formed on the body to secure the inverted cup to the body.

12. The base of claim 7, wherein the cup-shaped portion is circular for receiving an electronic device having a circular housing on the body of the base.

13. The base of claim 1, wherein the feet are located outward of an outer edge of the electronic device when the electronic device is located on the base.

14. The base of claim 13, wherein the channel is defined between an inner portion of the feet and the body of the base.

15. The base of claim 1, the body further comprising a ledge located on an inner portion of the body for supporting the electronic device above the cavity.

16. A base for supporting a data acquisition device on a surface, the base comprising:
    a body shaped to receive at least a portion of the acquisition device thereon;

a cavity formed in the body on a bottom portion of the body such that the cavity is between the electronic device and the surface when the electronic device is mounted on the base;

an insulating material located in the body, the insulating material located between a bottom side of the data acquisition device and a bottom of the body when the data acquisition device is located on the base;

a channel formed on the bottom portion of the body such that the channel is located between a portion of the electronic device and the surface, the channel shaped to allow air to flow therethrough;

one or more apertures formed through the body, the one or more apertures in fluid communication with the channel to allow air through the channel; and a plurality of feet arranged around the body, the feet having a lower surface that is shaped to contact the surface.

17. The base of claim 16, the feet further comprising a plurality of slots formed across a width of the lower surface.

18. The base of claim 16, further comprising a magnet located on the base for securing the base to the surface.

19. The base of claim 18, further comprising an inverted cup located at a bottom of the body, the inverted cup shaped to receive the magnet therein.

20. A base for supporting a data acquisition device on a surface, the base comprising:

a body shaped to receive at least a portion of the acquisition device thereon;

a cavity formed in the body on a bottom portion of the body such that the cavity is between the electronic device and the surface when the electronic device is mounted on the base;

an insulating material located in the body, the insulating material located between a bottom side of the data acquisition device and a bottom of the body when the data acquisition device is located on the base;

a channel formed on the bottom portion of the body such that the channel is located between a portion of the electronic device and the surface, the channel shaped to allow air to flow therethrough;

one or more apertures formed through the body, the one or more apertures in fluid communication with the channel to allow air through the channel; and a plurality of feet arranged around the body, the feet having a lower surface that is shaped to contact the surface, the feet further including a plurality of slots formed across a width of the lower surface.

* * * * *